United States Patent [19]

Sicard

[11] 4,057,268

[45] Nov. 8, 1977

[54] DISCONNECTABLE PIPE UNION AND DEVICE FOR MANEUVERING SAME

[75] Inventor: Hubert Sicard, Marseilles, France

[73] Assignee: Compagnie Maritime d'Expertises - Comex, Marseilles, France

[21] Appl. No.: 632,156

[22] Filed: Nov. 14, 1975

[30] Foreign Application Priority Data

Nov. 18, 1974 France ................................ 74.41050

[51] Int. Cl.² .............................................. F16L 21/06
[52] U.S. Cl. ........................................ 285/31; 285/39; 285/175; 285/299; 285/323; 285/388; 285/DIG. 21; 285/DIG. 13
[58] Field of Search .................... 285/18, 39, 322, 323, 285/DIG. 21, 31, 175, 32, 299, 343, 388, DIG. 7, DIG. 13

[56] References Cited

U.S. PATENT DOCUMENTS

| | | | |
|---|---|---|---|
| 3,090,437 | 5/1963 | Geer | 285/18 |
| 3,099,317 | 7/1963 | Todd | 285/DIG. 21 |
| 3,155,401 | 11/1964 | Musolf | 285/DIG. 7 |
| 3,222,088 | 12/1965 | Hoeber | 285/18 |
| 3,913,670 | 10/1975 | Ahlstone | 285/18 |

FOREIGN PATENT DOCUMENTS

| | | | |
|---|---|---|---|
| 271,367 | 11/1966 | Australia | 285/323 |
| 780,507 | 2/1935 | France | 285/343 |

*Primary Examiner*—Dave W. Arola
*Attorney, Agent, or Firm*—Brooks, Haidt, Haffner & Delahunty

[57] ABSTRACT

This invention relates to a union for assembling a smooth pipe end to a bush, composed of two half-unions fitted in each other and assembled by a nut fast with a toothed ring. Each half union comprises a jaw which cooperates with a sliding ring, which ring is displaced by means of a nut fast with a toothed gear. Said jaws comprise on their inner periphery truncated surfaces which cooperate with truncated surfaces carried by said sliding rings to disconnect the half-unions by manoeuvring said lock nuts.

7 Claims, 2 Drawing Figures

DISCONNECTABLE PIPE UNION AND DEVICE FOR MANEUVRING SAME

The present invention relates to a disconnectable pipe union and to a device for manoeuvring it, enabling automatic remote-controlled connections and disconnections to be carried out.

To lay an underwater pipe, particularly a pipe evacuating oil from an underwater oil well head, the pipes are welded end to end on the surface, as the line of welded pipes is let down to the sea-bed. The line of pipes laid on the sea-bed must then be connected to a pipe forming part of the well head or a production ring.

It is an object of the invention to provide for a novel union enabling such a connection to be made and the following specification will refer more particular to this particular application, this choice not being limiting and the invention protecting a new pipe union in all fields of application.

In the case of underwater oil conveying pipes, the pressures prevailing in the pipe are very high, for example pressures of the order of 210 bars or 3000 p.s.i. and the pipe unions must be water-tight and must resist the mechanical forces due to these high pressures, whilst being easy to position and connect.

So-called self-locking unions have heretofore generally been used, comprising jaws which fasten onto the pipes under the effect of the tightening of a nut.

Experience has shown that it was advantageus if such unions were easily disconnectable to allow subsequent dismantlings necessitated by maintenance work.

It is very difficult, if not impossible, to dismantle heretofore known self-locking unions since said dismantling may occur several years after the pipes were laid and at depths which are not easily accessible to a diver.

One object of the present invention is to produce self-locking unions enabling the end of a pipe to be connected to an underwater oil well head or enabling two pipes to be joined end to end, said unions being easy to disconnect.

Another object of the invention is to produce self-locking unions which may be fixed on the smooth end of a pipe placed on the sea-bed without necessitating any special bush that is to be fixed beforehand on the end of the pipe, nor any particular preparation of the end of the pipe other than a chamfer.

Another object of the invention is to produce unions enabling the end of an underwater pipe to be assembled at the head of an underwater oil well and subsequently to disconnect this assembly without divers having to dive to the sea-bed, this enabling a pipeline to be connected to a well head located at a depth exceeding the limit beyond which divers cannot have access.

A self-locking pipe union according to the invention comprises anchoring jaws which have at least one outer conical surface cooperating with the integral conical periphery of a ring which slides longitudinally under the effect of the tightening of a block nut.

The above-mentioned objects are attained by equipping said anchoring jaws and the sliding ring with means for forcing said jaws to loosen under the effect of the unscrewing of the lock nut.

These means are preferably constituted by at least one truncated surface, disposed on the internal periphery of the anchoring jaws and cooperating with a truncated surface of the sliding ring, these two truncated surfaces coverging in the same direction as the external conical surface of the jaws.

The anchoring jaws preferably comprise a truncated surface on the internal periphery of each of their two ends, each of these two surfaces cooperating with a truncated surface placed on the outer periphery of a projection on the sliding ring so that the anchoring jaws are pushed to the outside by their two ends.

A union according to the invention for connecting the end of a pipe to the outet of an apparatus, for example to the outlet of an underwater oil well, or for connecting two pipes together, is composed of two half-unions which hermetically fit into each other. One of these half-unions comprises an outside thread, whilst the other half-union moves in translation with an adjusting and assembling nut which is screwed on said thread so that the total length of the union may be varied to render it shorter than the length between the two ends of pipes to be connected, this enabling each half-union to be fitted onto a pipe end.

The lock- and adjusting nuts equipping the half-unions and the unions according to the invention are securely fixed to a toothed gear which makes it possible to screw and unscrew said nut to lock or disconnect the union.

The result of the invention is a novel self-locking union, particularly adapted to assemble the end of an underwater pipe on an underwater oil well head or on an underwater apparatus or for assembling two pipes end to end, for example in the case of a certain length of pipe having to be replaced on a pipe line already laid on the sea-bed.

One of the essential advantages of a union according to the invention is that it may be disconnected, even after several years in the sea-water, due to the jaw-loosening means which may exert on said jaws loosening forces which are equal to or even greater than the tightening forces and which allow a sure disconnection of the union without damaging it, so that it may be used again.

This advantage is very important in practice since the unions may have to be discnnected to effect maintenance work on apparatus or pipelines.

Another advantage of a union accórding to the invention composed of two half-unions which fit into each other under the action of an adjusting screw, is that it enables the length of the union to be adapted to the distance separating the ends of pipes to be connected and that the two half-unions may be engaged on the ends, then separated and finally locked on the pipes or the outlets of apparatus.

The fact that the lock and adjusting nuts of the unions according to the invention are equipped with a toothed gear makes it possible to manoeuvre said unions easily, particularly with the aid of a device constituted by racks moved by jacks and mounted on a variable-opening clamp which may therefore be adapted to different pipe diameters.

Said device for screwing and unscrewing the nuts presents the advantage that the operations of connecting and disconnecting a pipe on an underwater well head may be carried out without necessitating the presence of divers, thus at depths greater than the limits beyond which it is impossible for divers to work.

In fact, these clamp-shaped devices may be mounted on a chassis which also carries a union and which is lowered to the sea-bed, guided on cables fixed to the well head, this enabling it to be positioned.

The movements of the jacks which control the screwing or unscrewing of the nuts are then controlled from the surface. Once the union is connected, the clamps are opened and said device may be brought up to the surface to be used again.

When a union is to be disconnected, the device is again lowered along the guide cables then, with the aid of jacks, the clamps are moved longitudinally along the chassis of the apparatus until proximity detectors detect the presence of metallic studs fixed to the union and automatically stop the longitudinal displacement of the clamps which are then opposite the toothed gears fixed to the nuts. The movement of the racks is then controlled from the surface, said movement bringing about the loosening of the nuts and the unlocking of the jaws, as well as the fitting of two half-unions in each other.

The invention will be more readily understood on reading the following description with reference to the accompanying drawings, in which.

Figure 1:
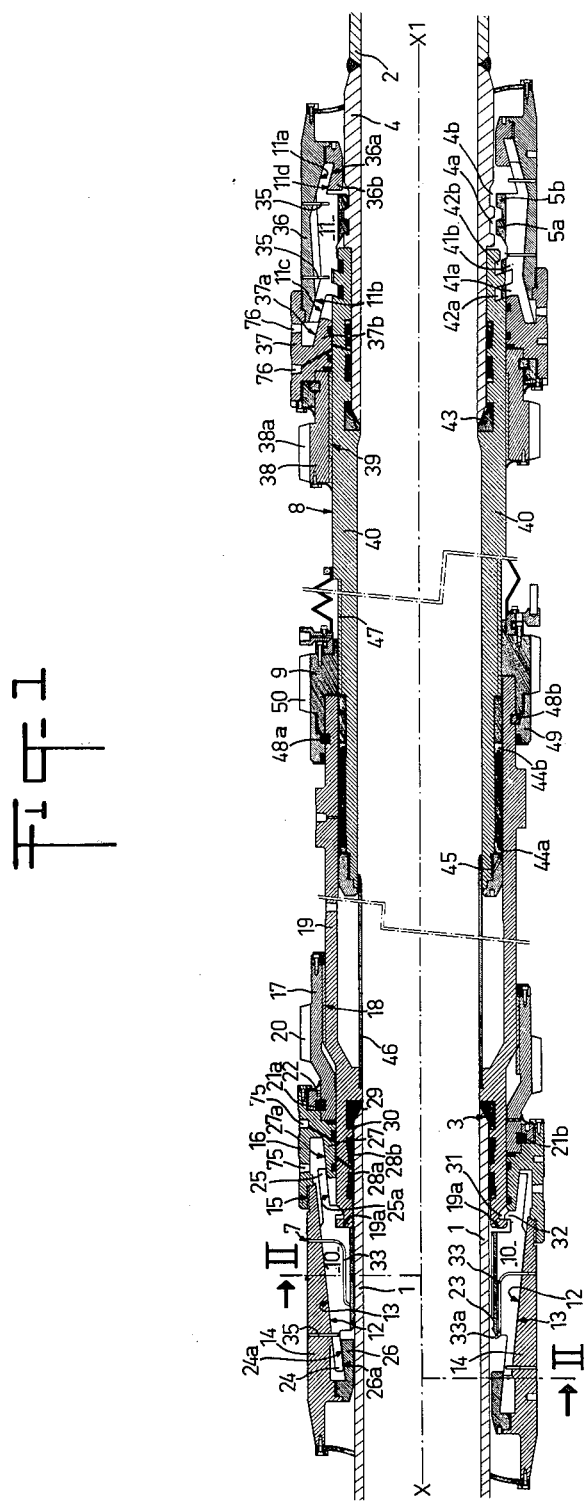
FIG. 1 is a longitudinal section through a union according to the invention.

Referring now to the drawings, FIG. 1 shows the end 1 of an underwater pipeline of axis x-xl which has to be assembled on the end 2 of a coaxial pipeline, of the same diameter, which is, for example, the outlet of an underwater oil well head.

The pipe end 1 is a smooth end, not having any special device nor preparation, with the exception of a chamfer 3. The cut and chamfer maybe made with the aid of a remote-controlled machine.

In the example described, the pipe end 2 is equipped with a special bush 4 comprising on its outer periphery peripheral grooves 4a, 4b intended to receive the peripheral ribs 5a, 5b provided on the jaws for anchoring the union to the bush 4.

A union 6 according to the invention is composed of two half-unions 7 and 8 fitted in each other and assembled together by a nut 9.

The lower part of the FIGURE shows the union in the position in which it is engaged on the two ends of pipes to be connected, without being locked. The upper part of the FIGURE shows the same union after anchoring of the two half-unions 7 and 8 on the smooth pipe end 1 and on the bush 4.

FIG. 1 shows by way of example a half-union 8 differing from the half-union 7 in that it is anchored on a special bush 4 comprising peripheral grooves. It is specified that this example has been chosen to illustrate two different embodiments of half-unions according to the invention. The bush 4 could also be a smooth bush and, in this case, the union 6 would be composed of two identical half-unions 7. The half-unions 7 and 8 each comprise jaws, 10 and 11 respectively. These jaws are composed of several juxtaposed sectors.

The jaw 10 comprises an outer conical surface 13 which coooperates with the inner conical surface 12 of a ring 14 surrounding said jaw.

The ring 14 comprises a male thread 15 on which is screwed a thrust ring 16. The rings 14 and 16 therefore move in axial translation. The half-union 7 further comprises a nut 17 which is screwed on a male thread 18 located on the periphery of the body 19 of the half-union. The nut 17 is securely fixed to a peripheral toothed gear 20 enabling it to be manoeuvred in the two directions.

The ring 16 and the nut 17 are assembled by two half-friction washers 21a and 21b held by a threaded ring 22 so that the ring 16 moves in translation with the nut 17 but not in rotation.

When the nut 17 is screwed on the thread 18 for passage from the position shown in the lower part of the FIGURE to the position shown in the top part, the ring 14 moves axially in the same direction as the nut and the jaw 10 is compressed radially by the wedge effect due to the interaction of the conical surfaces 12 and 13. The jaw 10 comprises on its inner face indentations or ridges 23 which encrust in the pipe 1 and which produce the anchorage of the half-union 7 on the pipe 1. The self-locking half-union 7 is so-called since the assembling of the union on the pipe is effected solely by the effect of tightening of the nut 17.

The half-union 7 comprises, in addition, means enabling it to be disconnected, i.e. for loosening the jaw 10 to release the half-union.

These means are constituted by two projections 24 and 25 located at the two ends of the jaw 10, both presenting a truncated internal surface 24 and 25a.

The rings 14 and 16 also each comprise a projection, 26 and 27 respectively, each having a truncated outer surface 26a and 27a. The surfaces 26a and 24a are parallel to each other, as are surfaces 25a and 27a. They are also parallel, in the case of the FIGURE, to surfaces 12 and 13.

When the nut 17 is unscrewed for passage from the position shown at the top of the FIGURE to the position shown at the bottom, the rings 14 and 16 move axially towards the outside and the surface 26a and 27a exert on the two ends of the jaw 10 a radial thrust which opens the jaw, and disconnects the half-union 7 from the end 1 of the pipe.

The seal between the half-union 7 and the pipe end 1 is obtained by rimmed joints 28a and 28b placed between the body 19 of the half-union and the pipe 1 and by an annular seal 29 which abuts against the chamfer 3 by the tightening of the nut 17. A ring 30 adjusted to the outer diameter of the pipe 1 enables the half-union 7 to be centered on the pipe 1. The body 19 of the half-union 7 comprises at its outer end a peripheral groove 31 in which engages a rib 32 located on the internal surface of the extension 25 of the jaw 10.

The rib 32 has a thickness smaller than the width of the groove 31 so that, when the jaw 10 is in abutment against the end 19a of the body 19, there is a clearance between the outer face of the rib 32 and the inner face of the groove 31, as shown in the upper part of the FIGURE. This clearance enables the jaw 10 to move slightly in the direction which increases the tightening of the jaw, so that, if the jaw tends to slide on the pipe due to poor tightening, a self-tightening of the half-union is produced.

To obtain this self-tightening, it is necessary for the jaw 10 to come into abutment againt the end 19a of the body 19 when the union is assembled.

Under the effect of the axial component of the thrust exerted by the ring 14 against the outer surface 12 of the jaw 10, when the union is tightened, the jaw 10 tends to abut against the end 10a. However, a slide might be produced between the surfaces 12 and 13. To ensure that the jaw 10 abuts against the end 19a, the ring 14 is equipped with one or more elastic rods 33 which penetrate into longitudinal slots of the jaw 10 and which, at their outer end, comprise a hook 33a which abuts on the outer end of the jaw 10. In this way, when the ring 14 moves towards the body 19, the hook 33a forcibly takes the jaw 10 along with it until it abuts against the end 19a as shown in the lower part of the FIGURE.

Once the jaw has come to its position of abutment the rod 33 is deformed and the hook 33a retracts inside the slot.

Figure 2:
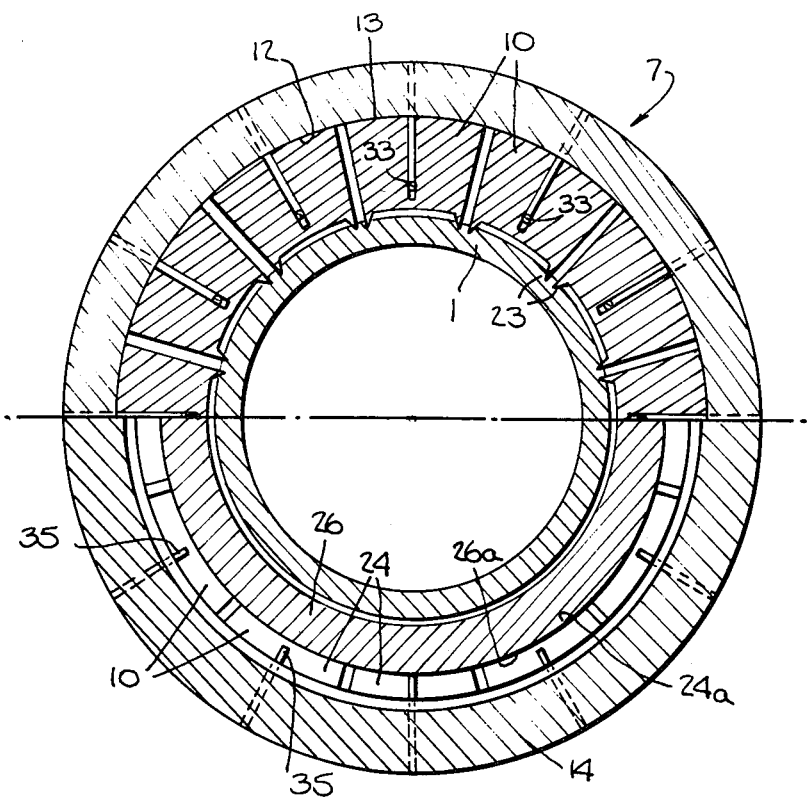
FIG. 2 is a view in half section and in half outside view along line II—II of the jaws of FIG. 1.

FIG. 2 shows a section through the jaw 10 passing through broken line II—II.

The jaw 10 is composed of juxtaposed sectors 10a comprises a longitudinal slot 34 in which are housed rods 33 and 35 whose function is to maintain equidistance between the segments 10a. The half-union 8 is also composed of a locking jaw 11 and a sliding ring in two parts 36 and 37. The sliding of these rings is controlled by the screwing of the nut 38 fast with a toothed gear 38a on the male thread 39 of the body 40.

In the example shown, the jaw 11 comprises two outer conical surfaces 11a and 11b which cooperate with inner conical surfaces of the ring 36 to produce the tightening of the jaw 11. The jaw 11 comprises on its inner periphery ribs 5a, 5b which engage, during the tightening in the grooves 4a and 4b of the bush 4 and ribs 41a, 41b which fit in grooves 42a, 42b of the body 40, hence the anchoring of the half-union 8 on the bush 4.

The ribs 41a, 41b and the grooves 42a 42b have inclined sides so that the penetration of the ribs into the grooves brings the body 40 towards the right and causes crushing of the seal 43.

The jaw 11 comprises, like jaw 10, two truncated surfaces 11d and 11c disposed at each of its ends and on its inner periphery, which cooperate with truncated surfaces 36a and 37a disposed on the outer periphery of projections 36b and 37b of the rings 36 and 37.

The bodies 19 and 40 of the two half-unions fit into each other and rimmed seals 44a and 44b are placed between them and maintained in place by a threaded ring 45. A cylindrical skirt 46 is fixed to the body 19 to allow passage of a scraper in the pipe.

The body 40 comprises on its periphery a male thread 47 of great length. The half-unions are assembled together by an assembling nut 9 which is screwed on the thread 47 and which moves in translation with the body 19 by two half friction washers 48a and 48b, held by a threaded ring 49.

The nut 9 which is fast with a toothed gear 50 makes it possible to vary the length of fit of the body 40 of the half-union 8 in the body 19 of the half-union 7 and thus to vary the total length of the union. By acting on the nut 9, the length of the union may thus be adjusted so that it becomes shorter than the distance which separates the ends opposite the pipe 1 and the bush 4, so as to fit the half-unions on these ends, then, by manoeuvring the nut 9 in the reverse direction, the seals 29 and 43 are brought into abutment against the ends of the pipes to be connected.

When assembling has been effected, the sea-water filling the different cavities of the union is evacuated by means of a scavenging by a stable oil which is injected through orifices 75 and 76.

What is claimed is:

1. A pipe union comprising an annular body for receiving and engaging a pipe end portion to which the union is to be secured, ring means comprising at least one ring for receiving and extending around said pipe end portion at a portion thereof spaced from the end of said pipe, said ring having an inner truncated conical surface co-axial with and extending at an angle to the longitudinal axis of said pipe, said surface increasing in diameter in the direction of said end of said pipe and said ring being mounted for movement parallel to said axis and toward said end of said pipe, a plurality of anchoring jaws for extending around said pipe end portion intermediate said surface of said ring and said pipe end portion, each of said jaws having an internal surface engageable with the outer surface of said pipe end portion and having an external surface conforming to the surface of a truncated cone co-axial with said pipe axis and engaging and mating with said inner surface of said ring, said jaws being movable toward said pipe axis with movement of said ring parallel to said pipe axis and toward said annular body, the engagement of said external surface of said jaws with the inner surface of said ring forcing said jaws toward said pipe axis, screw threaded means interconnecting said body and said ring means for moving said ring toward and away from said body and parallel to said pipe axis, said ring means also having at least one further truncated, conical surface facing outwardly of and co-axial with said pipe axis, said further surface increasing in diameter in the same direction as said inner conical surface of said ring, and each of said jaws also having a further surface facing toward and co-axial with said pipe axis, said last-mentioned further surface conforming to the surface of a truncated cone and being engageable and matable with said further surface of said ring means for moving said jaws away from said pipe axis with movement of said ring parallel to said pipe axis and away from said annular body.

2. A pipe union as set forth in claim 9, wherein said further surface of said jaws is at one axial end thereof and said further surface of said ring means is adjacent to said further surface of said jaws and wherein each of said jaws has another further surface the same as said last-mentioned further surface but at the opposite axial end thereof, and said ring means has another further surface the same as the first-mentioned further surface thereof disposed adjacent said other further surface of said jaws and engageable with the latter for moving said jaws away from said pipe axis.

3. A pipe union as set forth in claim 9, wherein said jaws have an annular groove therein at the end thereof nearer said body, said groove being displaced from said end of said jaws to provide an inner peripheral rib and wherein said body has a portion within a portion of said jaws at said end, said body portion having an annular groove receiving said rib and the axial dimension of said rib being less than the axial dimension of said last-mentioned groove to permit limited movement of said jaws with respect to said body.

4. A pipe union as set forth in claim 11, wherein said rib and said groove in said body portion have mating surfaces inclined with respect to said axis of said pipe, said last-mentioned surfaces increasing in diameter in the axial direction from said jaws toward said body.

5. A pipe union as set forth in claim 9, wherein said jaws have axially extending slits therebetween, further comprising spacing rods in said slits, at least one of said rods engaging said ring and a portion of said jaws for causing said jaws to move axially with axial movement of said ring and being deformable with said axial movement of said ring after a predetermined amount of said movement.

6. A pipe union as set forth in claim 9 including another body joined to said annular body, said another body including ring means, screw threaded means and jaws operating together as those on said annular body, one said body having an external size less than the internal size of the other said body to permit one body to telescope within the other, and further comprising sealing means for sealing one said body to the other said body, a screw threaded nut rotatably secured to one said body and mating screw thread on the other said body and cooperating with said nut for moving one said body with respect to the other said body in the direction of said axis of said pipe and thereby varying the distance between the ring means connected to one said body and the ring means connected to the other said body.

7. A pipe union as set forth in claim 14, wherein said nut has gear teeth on the periphery thereof permitting rotation thereof by engagement of rotating means with said teeth, wherein said nut has an annular groove therein and the body to which said nut is connected has an adjacent annular groove therein, said nut being connected to said last-mentioned body by a washer extending into both said groove in said nut and said groove in said last-mentioned body, whereby said nut may be rotated without rotation of said last-mentioned body and wherein each of said ring means has two parts, one part being connected to its associated body by screw threads on the part and on the body to which it is connected and forming said screw threaded means, said one part also having gear teeth on the periphery thereof permitting rotation thereof by engagement of rotating means with said teeth, said other part being formed by said ring means and said one part and said other part each having adjacent annular grooves, said one part and said other part being connected by a washer extending into both the groove in said one part and the groove in said other part, whereby said one part may be rotated without rotating said other part.

* * * * *

UNITED STATES PATENT AND TRADEMARK OFFICE
CERTIFICATE OF CORRECTION

PATENT NO. : 4,057,268
DATED : November 8, 1977
INVENTOR(S) : HUBERT SICARD

It is certified that error appears in the above—identified patent and that said Letters Patent are hereby corrected as shown below:

Col. 4, line 57 - "againt" should read --against--

Col. 4, line 62 - "10a" should read --19a"

Col. 6, line 33 - "9" should read --1--

Col. 6, line 43 - "9" should read --1--

Col. 6, line 53 - "11" should read --3--

Col. 6, line 58 - "9" should read --1--

Col. 6, line 66 - "9" should read --1--

Col. 7, line 13 - "14" should read --6--

Signed and Sealed this

Twenty-seventh Day of June 1978

[SEAL]

Attest:

RUTH C. MASON
Attesting Officer

DONALD W. BANNER
Commissioner of Patents and Trademarks